United States Patent [19]
Littmann

[11] 3,765,700
[45] Oct. 16, 1973

[54] REUSABLE AND AUTOMATICALLY RESETTABLE ENERGY DISSIPATING DEVICE

[75] Inventor: Joseph C. Littmann, Northridge, Calif.

[73] Assignee: American Safety Equipment Corporation, New York, N.Y.

[22] Filed: Oct. 28, 1971

[21] Appl. No.: 193,358

[52] U.S. Cl. ............ 280/150 SB, 297/386, 188/1 C
[51] Int. Cl. ............................................ B60r 21/10
[58] Field of Search ................. 280/150 SB, 179 A, 280/179 R; 188/1 C, 1 R; 293/DIG. 3; 297/385, 386, 216; 267/161, 162

[56] References Cited
UNITED STATES PATENTS

| 2,713,482 | 7/1955 | Stapleton | 267/162 |
| 2,880,815 | 4/1959 | Apfelbaum | 280/150 SB |
| 3,138,405 | 6/1964 | Hanway | 297/386 |
| 3,185,246 | 5/1965 | Maurer | 297/385 UX |
| 3,313,567 | 4/1967 | Sturman | 267/161 |
| 3,431,019 | 3/1969 | Lewis | 297/385 X |
| 3,455,603 | 7/1969 | Nicholas | 297/385 X |
| 3,484,134 | 12/1969 | Townsend | 297/386 |

Primary Examiner—Leo Friaglia
Assistant Examiner—Reinhard Eisenzopf
Attorney—C. A. Miketta et al.

[57] ABSTRACT

The device includes a safety belt retractor frame having a rearwardly extending slotted tongue with a centrally located axial protrusion extending forwardly into the slot; a pair of vehicle mounted slotted anchor members sandwiched around the tongue and having centrally located axial protrusions aligned with and extending oppositely to the tongue protrusion; and a plurality of coned washer springs positioned in the slots on the protrusions for being deformed, upon forward movement of the retractor due to impact of the vehicle, to provide generally linearly increasing load deflection characteristics for evenly applying and cushioning the restraining load of the safety belt on a person and for dissipating the majority of the energy of the person due to the impact with energy remaining in the coned washer springs automatically returning the retractor frame to its pre-impact position. The coned washer springs may be positioned in consecutive pairs with like ends engaging or additional coned washer springs may be stacked or nested outwardly from at least one such pair of springs.

11 Claims, 5 Drawing Figures

Patented Oct. 16, 1973

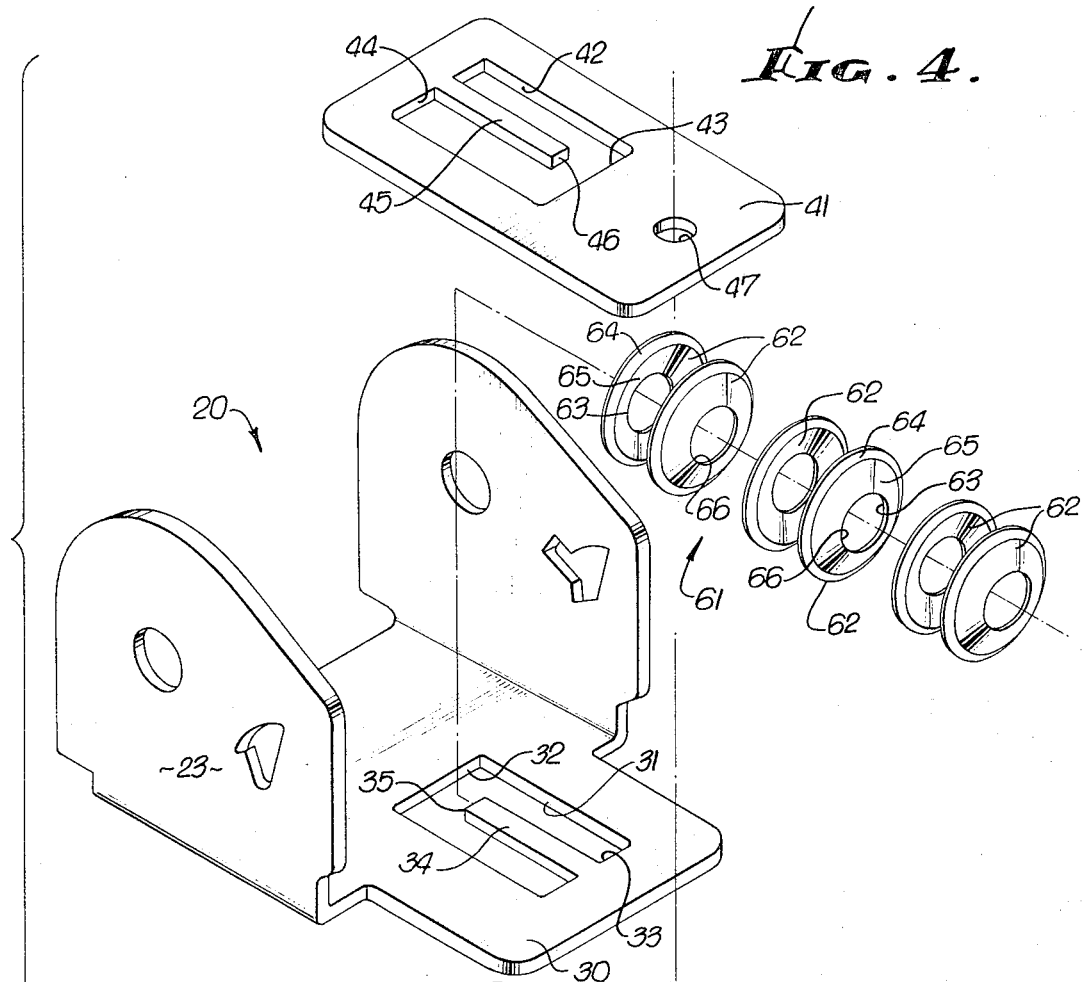

REUSABLE AND AUTOMATICALLY RESETTABLE ENERGY DISSIPATING DEVICE

BACKGROUND OF THE INVENTION

This invention relates to energy dissipating devices for safety belt systems and more particularly to such an energy dissipating device which compensates for the load deflection characteristics of a safety belt to evenly apply and cushion the restraint load of the safety belt on the wearer and which thereafter automatically returns to its pre-impact position.

Safety belt systems are installed in automobiles, trucks, airplanes, and other vehicles and are worn by a person in the vehicle to restrain the person in the event of an accident, and prevent him from being injured. However, in such an accident or crash, the sudden loading of the person's body by the safety belt is uncomfortable, and if the belt is not properly located, may also be injurious.

Such abrupt or sudden loading of the person by the safety belt is not necessary. The vehicle has space for limited forward movement before the person contacts the interior of the vehicle. Therefore, energy absorbing devices have been developed for mounting the anchor end of a safety belt. These energy absorbing devices allow limited forward movement of the person, during which the kinetic energy of the person due to the motion of the vehicle is absorbed by plastic deformation by the energy absorbing devices to cushion the restraining load of the belt on the person's body. For example, the following U.S. Patents show such devices - U.S. Pat. Nos. 3,409,327; 3,429,613; 3,438,674; 3,482,872; 3,486,791; 3,494,571 and 3,532,380. In all of these devices, the energy is dissipated by a one-time plastic deformation, after which the device must be replaced. Such replacement of the energy absorbing device after only a one-time use is costly, time-consuming and necessary.

There is another problem associated with the action of a safety belt on the body of a person in the event of a crash. This problem is presented because a safety belt, upon being uniformly loaded, itself stretches at an uneven rate. The uneven rate of stretch of the belt applies a variable load on the person which again is uncomfortable and which, in the event of improper location of the belt, may again be injurious. In order to correct the problem, compensation should be provided for the load deflection characteristics of the safety belt so that the restraining load of the belt applied to the person will be generally uniform. An ideal solution to the problem would be to provide an energy absorbing device for the safety belt which has load deflection characteristics complementary to those of the belt to thereby provide a uniformly increasing loading rate on the body of the person. None of the prior art energy absorbing devices, disclosed in the previously cited prior art patents, provide such compensating load deflection characteristics although such compensation is highly desirable.

One reason for the lack of compensating load deflection characteristics in the prior art devices is the pattern of the load deflection characteristics of the safety belt for which compensation must be made. The load deflection pattern of a safety belt is generally flat and then rises sharply so that a compensating load deflection pattern would need to initially rise sharply and then flatten out. To provide an energy dissipating device with a load deflection pattern of suitable characteristics to complement a safety belt has not been heretofore accomplished.

BRIEF DESCRIPTION OF THE INVENTION

Therefore, it is the primary object of this invention to provide a novel energy dissipating device for safety belt systems which, upon impact, compensates for the load deflection characteristics of the safety belt to evenly apply and cushion the application of restraint load on a person wearing the belt, and which, thereafter, automatically returns to its pre-impact position.

Other and additional objects of this invention are to provide such an energy dissipating device which is adaptable to different load deflection characteristics of different types of safety belts and safety belt systems; which dissipates the majority of the energy applied thereto while utilizing any remaining energy to return the device to a pre-impact condition; which eliminates uneven loading of the person's body due to the load deflection characteristics of the safety belt; which is usable with minimal modifications to existing safety belt mounting means such as retractors; which is adaptable to different types of safety belts and which is economical to manufacture, easy to install and dependable in operation to evenly restrain and thereby protect the wearer of the safety belt from injurious contact with the interior of the vehicle during a crash or other impact.

Generally, the energy dissipating device, according to this invention, includes a first member having a belt secured thereto, a second member for mounting to a vehicle, and reusable energy dissipating means positioned between the first and second members for providing, upon impact of the vehicle, a generally linearly increasing load deflection characteristic for evenly applying and cushioning the restraining load of the belt on the person and for dissipating the majority of the energy of the person due to impact, with the energy remaining therein, automatically returning the energy dissipating means to the pre-impact position. The members may have slots therein to provide load receiving surfaces. The energy dissipating means may include coned washer springs in various orientations and retained in place by protrusions extending into the slots and through central holes in the springs. The first member may be a tongue on a belt reel retractor frame, and the second member may include upper and lower portions between which the first member is sandwiched.

BRIEF DESCRIPTION OF THE DRAWINGS

FIG. 4 is an exploded perspective view of the energy dissipating device;

FIG. 5 is a view similar to FIG. 2 but showing a different orientation of the coned washer springs to provide somewhat different load deflection characteristics than the characteristics intended to be provided by the orientation of the coned washer springs of FIG. 2.

DETAILED DESCRIPTION OF THE PREFERRED EMBODIMENTS

Figure 1:
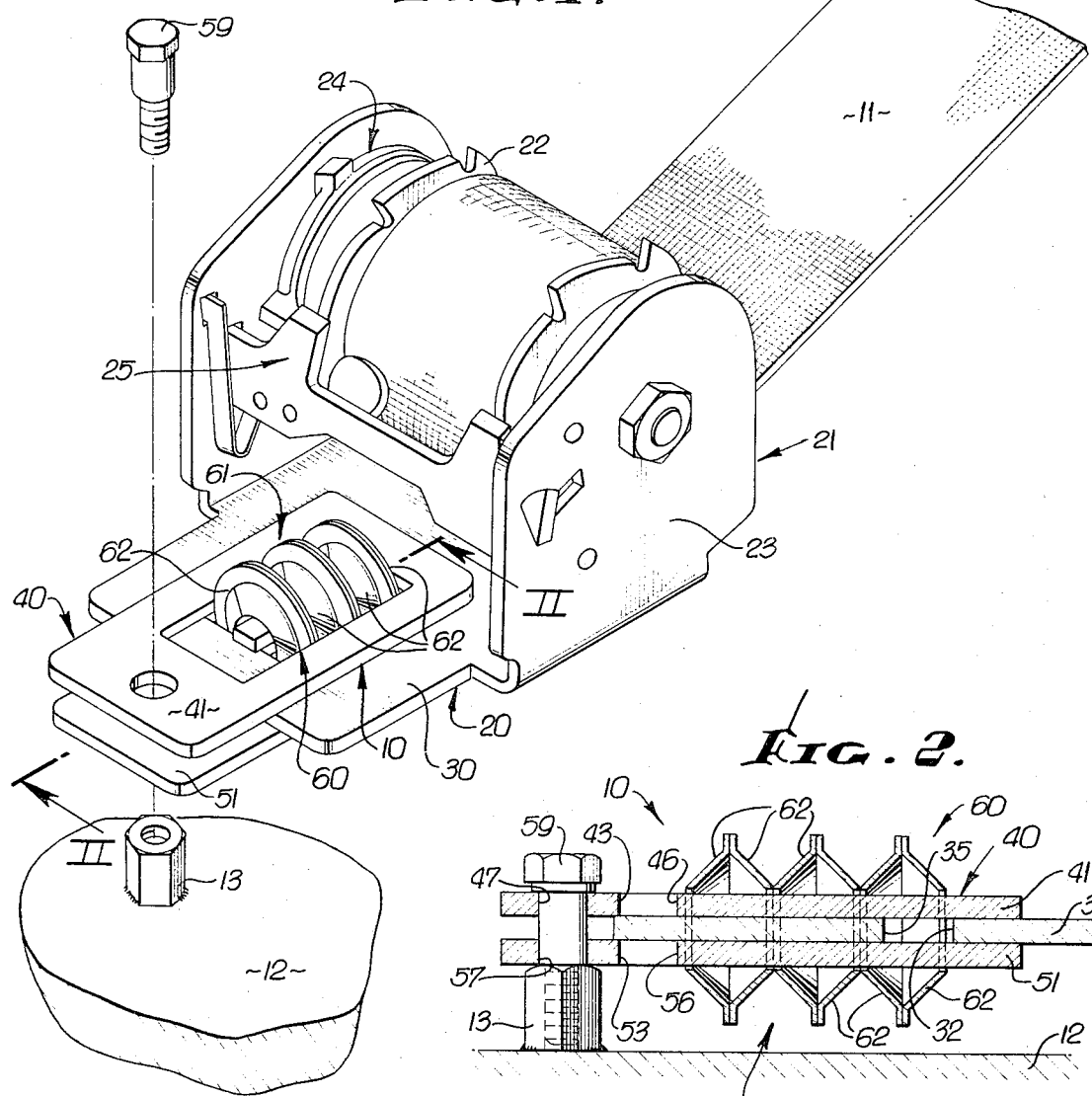
FIG. 1 is a perspective view of the energy dissipating device, according to this invention, shown as part of a safety belt mounting reel retractor and adapted to be anchored to the floor of a vehicle.

Referring now to the drawings and particularly to FIG. 1, the energy dissipating device according to this invention is generally denoted by the number 10. The energy dissipating device 10 is for anchoring a conventional safety belt 11, such as a seat belt or shoulder belt, to a vehicle 12. Typically, the vehicle 12 will have a nut 13 welded thereto for anchoring the device 10.

As is well known, safety belts 11 are provided in the vehicle 12 to be fastened about a person riding in or driving the vehicle to restrain the person from injurious contact with the vehicle during impact of the vehicle. Without such restraint, a person riding the vehicle would possess sufficient kinetic energy from the motion of the vehicle, that he would, upon deceleration of the vehicle due to impact, continue forward until he contacts the vehicle itself and injures himself. The function of the safety belts 11 are to restrain the person against such continued forward motion upon deceleration of the vehicle. This function has heretofore been provided by attempting to abruptly restrain the person against his seat. Such abrupt restraint by the belt applies loads to the person which are uncomfortable and may even be injurious, though certainly not as injurious as contacting the vehicle would be. Also, such abrupt restraint is not necessary because the person usually has space in the vehicle for limited forward movement, and this space could therefore be used to assist in cushioning the restraining load of the belts 11 on the person. The belts 11 alone provide some cushioning effect because upon being loaded, they stretch. However, safety belts 11 initially stretch at a rapid rate and then abruptly change to stretch at a slow rate. Such an abrupt change in the load deflection characteristics of a belt, would cause the restraining load to be abruptly applied to the person. The energy dissipating device 10, according to this invention, complements the rapid rate and then the slow rate of stretch of the safety belt 11 mounted thereto, to uniformly apply and cushion the restraining load of the belt 11 on the person. The device 10 also dissipates the majority of the kinetic energy of the person produced in slowing the person, with the remaining stored energy returning the dissipating device to its pre-impact position.

The energy dissipating device 10 according to this invention, generally includes a first member 20 having the belt 11 secured thereto, a second or anchor member 40 for mounting to the vehicle 12, and reusable and automatically resettable energy dissipating means 60 positioned between the members 20 and 40 for providing, upon impact, generally linearly increasing load deflection characteristics for uniformly applying and cushioning the restraining load of the belt on the person, and for dissipating the majority of the energy of the person due to impact. The energy, remaining in the energy dissipating means 60 after impact, automatically returns the energy dissipating device 10 to its pre-impact position.

The first member 20 having the belt 11 secured thereto, could be any type of a belt securing member, but because of the wide use of retractors, the first member 20 is illustrated as being a retractor 21. The retractor 21 typically includes a belt reel 22 rotatably mounted in a retractor frame 23. The frame 23 also typically is provided with biasing means 24 for biasing the reel 22 to retract the belt 11 and with locking means 25 for selectively locking the reel 22 to hold the belt 11 against further extension.

As best seen in FIG. 4, the frame 23 of the retractor 21 is modified to provide a rearwardly extending tongue 30. The tongue 30 has a generally rectangular slot 31 formed therein which is longitudinally defined by a forward, non-load bearing surface 32 and a rearward, load bearing surface 33. The load bearing surface 33 has an elongated forwardly extending protrusion 34 extending therefrom axially into the slot 31 and terminates in an end 35 located adjacent to, but spaced from the forward surface 32. The tongue 30, so formed, is for use with the second or anchor member 40.

The second or anchor member 40 is for mounting to the vehicle 12 and is shown as including upper and lower portions 41 and 51 for receiving the tongue 30 therebetween. The two portions 41 and 51 are provided to more evenly dis-tribute the anchoring load, but is is with the scope of this invention to provide only one such portion, i.e., either portion 41 or 51 if so desired.

The upper portion 41 is a generally rectangular plate having a generally rectangular slot 42 formed therein. The slot 42 is longitudinally defined by a rearward, non-load bearing surface 43 and by a forward or load bearing surface 44. A centrally located, elongated protrusion 45 extends rearwardly from load bearing surface 44 towards the rearward surface 43 to terminate in an end 46 adjacent to, but spaced from the rearward surface 43. The upper portion 41 also includes an anchor bolt hole 47 therethrough.

The lower portion 51 is identical to the upper portion 41 and has a plate with a slot 52 defined by a rearward non-load bearing surface 53 and by a forward or load bearing surface 54. A protrusion 55 with an end 56 extends from the load bearing surface 54. An anchor bolt hole 57 is provided in the lower portion 51 to receive a shoulder bolt 59 therethrough after having passed through the hole 47, and before being threaded into nut 13. As best seen in FIG. 1, the upper and lower portions 41 and 51 are positioned on either side of and have sandwiched therebetween the tongue 30 of the retractor 21.

The reusable energy dissipating means 60 of the illustrated embodiment includes the provision of coned washer spring means 61 positioned between the load bearing surfaces 33 and 44, 54 of the first and second members 20 and 40 and are adapted to be deflected by relative movement of these members 20 and 40 upon loading of the belt 11 due to impact. The deflection of the coned washer spring means 61 absorbs the majority of the energy applied thereto and yet stores enough energy to automatically return the means 60 to its free or unstressed state.

The coned washer spring means 61 of the illustrated embodiment are coned washer springs 62 commonly called "Belleville springs" having a narrow end 63, a wide end 64 and a coned body 65 therebetween. The springs 62 each have a central opening 66 therein.

The coned washer springs 62 are adapted to be assembled or inserted individually into the slots 31, 42 and 52 and positioned between the load bearing surfaces 33, and 44, 54, on the protrusions 34, 45 and 55 which hold the washer springs 62 in the slots.

Figure 2:
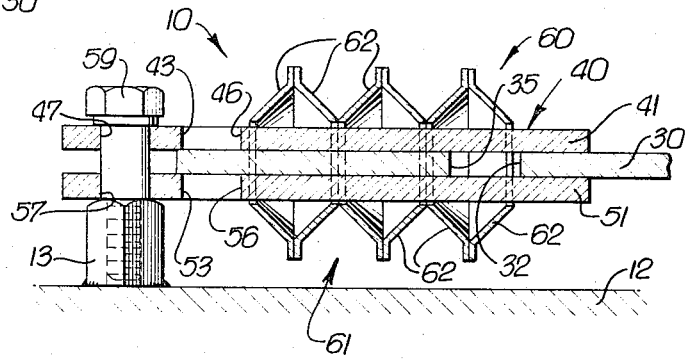
FIG. 2 is a fragmentary cross-sectional view taken along the plane II—II of FIG. 1, showing the energy dissipating device in a pre-impact position, with opposed pairs of coned washer springs in their free or unstressed state.
Figure 3:
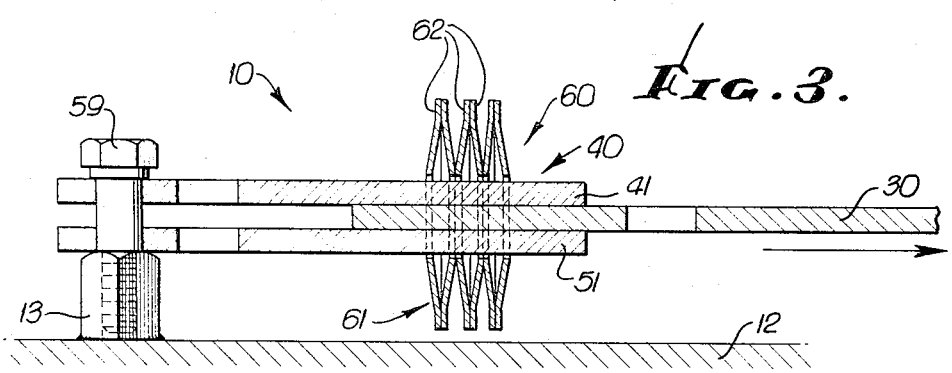
FIG. 3 is a view similar to FIG. 2 but showing the energy dissipating device in an impact position with opposed pairs of coned washer springs in a deformed or stressed state after frictionally dissipating the energy applied thereto.

There are various possible orientations of the washer springs 62 which will provide somewhat different load deflection characteristics to the device 10 while dissipating the energy thereof. One such orientation of the spring 62 is shown in FIGS. 2 and 3, wherein the springs 62 are provided in consecutive pairs with the wide ends 64 of each pair engaging. Conversely, the narrow ends 63 of each pair could engage.

Another orientation is shown in FIG. 5 in which a centrally located pair of washer springs 62 have their wide ends 64 engaging, and the rest of the washer springs 62 are stacked or nested outwardly from each side thereof. By changing the orientation and the dimensions of the washer springs 62, load deflection characteristics can be developed which are complementary to the load deflection characteristics of any particular type of safety belt 11 and to provide linearly increasing load deflection characteristics to the system. Such linearly load deflection characteristics for the system will uniformly apply and cushion the restraining load of the belt 11 on the person due to impact to provide a novel energy dissipating device 10.

Each of the springs 62 are so designed that the opening or holes 66 are of sufficient size to slidably receive all three of the protrusions 34, 45 and 55 when the members 30, 41 and 51 are assembled together in the position shown in FIG. 1.

It is contemplated that the energy dissipating device 10 will be supplied as an assembled unit on the retractor 21 or other first member 20 to which the belt 11 is mounted. To assemble the device 10, the tongue 30 is sandwiched between the portions 41 and 51 with the protrusions 34 and 45, 55 extending oppositely, and overlying each other. The portions 41 and 51 are positioned on the tongue 30 such that the end 35 is spaced a washer spring thickness from the ends 46 and 56 to provide an assembly position. The coned washer springs 62 then may be individually inserted with the desired orientation into the space between ends 35, 46 and 56 and slid onto the protrusions 45 and 55.

Since more springs 62 will normally be required than can be assembled on protrusions 45 and 55 in the assembly position, the springs 62, of necessity, will be compressed during the assembly operation on such protrusions 45 and 55. When all of the springs 62 have been so assembled, the member 30 may be moved forwardly from the assembly position to the position shown in FIG. 2 so that protrusion 34 is moved through the openings 66 in each of the springs 62 assembled on protrusions 45 and 55 until the holes 47 and 57 are in alignment with each other. The springs 62 may then be released from the compressed condition and allowed to expand into their normal and unstressed condition.

The described assembly operation of the springs is prefered, but other methods may be used and be within the scope of this invention.

The shoulder bolt 59 may then be inserted through holes 47 and 57 and threaded into the nut 13 to mount the belt 11 to the vehicle 12. The belt 11 is now ready to be fastened about a person to restrain him against injurious contact with the vehicle 12 upon impact.

Upon impact of the vehicle 12, the belt 11 anchored to the vehicle 12 will decelerate therewith, and will apply a restraining load to the person. As the load is initially applied, the belt 11 will stretch to cushion the application of the load. As the belt 11 stretches it will require more and more load to keep stretching at the same rate. In the meantime, the belt 11 will pull on the retractor 21 and attempt to pull the tongue 30 forwardly from between the upper and lower portions 41 and 51 of the anchor member 40. The coned washer springs 62 between the load bearing surfaces 33 and 44, 54 will be deformed from their free or unstressed condition, as seen in FIG. 2, to a stressed condition, as seen in FIG. 3. Such deformation occurs very slowly at first and requires high loads but once it begins, the deformation will occur rapidly. The coned washer springs 62 are suitably designed such that the rapid deformation begins just as the stretching of the belt 11 slows to provide linearly increasing load deflection characteristics to the combination. As the coned washer springs 62 are deformed, they frictionally rub surfaces with each other so that the majority of the energy required to deform the coned washer spring 62 is frictionally changed to heat.

After the impact has occured, and the restraining load is released from the belt 11, the minimal energy stored in the coned washer spring 62 automatically returns these springs to their normal condition and returns the retractor 21 to its pre-impact position, as shown in FIG. 2. The springs 62 will be slowly cooled by the air passing therearound to complete the return of the device to its pre-impact condition and ready for use when needed again.

I claim:

1. A reusable and automatically resettable energy dissipating device for anchoring a safety belt adapted to be secured about a person to a vehicle body mount to restrain the person from injurious contact with the vehicle during impact of the vehicle, said device comprising:

a first member having the belt secured thereto and a load receiving surface facing the belt, a second member for mounting to the vehicle body mount and having a load receiving surface facing the vehicle body mount, said members being positioned with said load receiving surfaces facing each other and wherein each of the members includes a protrusion extending from each load receiving surface towards the other load receiving surface, and reusable energy dissipating means positioned between the first and second members for providing, upon impact of the vehicle, generally linearly increasing load deflection characteristics wherein the energy dissipating means includes coned washer spring means positioned between the load receiving surfaces, said surfaces moving towards each other upon impact to deflect the coned washer spring means therebetween, and wherein the coned washer spring means include a plurality of coned washer springs, each of which has a central opening therein, and said springs are positioned on said members by said protrusions slidably extending through said spring openings.

2. The invention as in claim 1 wherein the members each have a slot with a forward edge of the slot of one member and the rearward edge of the slot of the other member being the load receiving surfaces and having said protrusions extending therefrom.

3. The invention as in claim 2 wherein the protrusions terminate at least a washer spring thickness from the end of the slot to permit insertion of the washer spring into the slot for assembly onto the protrusions.

4. A reusable and automatically resettable energy dissipating device for anchoring a safety belt adapted to be secured about a person to restrain the person from injurious contact with the vehicle during impact of the vehicle, said device comprising:
- a safety belt mounting reel retractor having a frame with a tongue member,
- a second member for mounting to the vehicle, and wherein the second member includes upper and lower portions for receiving the tongue member sandwiched therebetween, said upper and lower portions being mounted to the vehicle body in spaced relationship to each other, and
- reusable energy dissipating means positioned between portions of the tongue and second members for providing, upon impact of the vehicle, generally linearly increasing load deflection characteristics, for cushioning the restraining load of the belt on the person and for dissipating the majority of the energy of the person due to the impact, with the energy remaining therein automatically returning the energy dissipating means, and thereby said members, to their pre-impact position.

5. A reusable and automatically resettable energy dissipating device for anchoring a safety belt adapted to be secured about a person to a vehicle body mount to restrain the person from injurious contact with the vehicle during impact of the vehicle, said device comprising:
- a first member having the belt secured thereto and a load receiving surface facing the belt,
- a second member for mounting to the vehicle body mount and having a load receiving surface facing the vehicle body mount, said members being positioned with said load receiving surfaces facing each other, the second member including identical upper and lower portions for receiving the first member sandwiched therebetween, said upper and lower portions being mounted to the vehicle body mount in spaced relationship to each other, and
- reusable energy dissipating means positioned between the first and second members for providing, upon impact of the vehicle, generally linearly increasing load deflection characteristics, for uniformly applying the cushioning the restraining load of the belt on the person, said energy dissipating means including coned washer spring means positioned between the load receiving surfaces, said surfaces moving towards each other upon impact to deflect the coned washer spring means therebetween, and
- wherein the upper and lower portions each have a protrusion extending from its load receiving surface, and wherein the first member has a protrusion extending from its load receiving surface, said protrusions being aligned and oppositely extending to receive the coned washer spring means thereon.

6. In a safety belt retractor for mounting a selectively extensible and retractable safety belt to a vehicle, said safety belt adapted to be secured about a person to restrain the person from injurious contact with the vehicle during impact of the vehicle, said retractor including a belt mounting reel and a frame in which the reel is rotatably mounted, the improvement comprising the provision of:
- a tongue on said frame having a slot therein bounded at one end by a load receiving surface,
- an anchor member for mounting to the vehicle, said anchor member also having a slot therein bounded at one end by a load receiving surface, the tongue of the frame being located adjacent the anchor member to align the two slots with the two load receiving surfaces facing each other, and
- reusable energy dissipating means positioned between the retractor frame and the anchor member for providing, upon impact of the vehicle, generally linearly increasing load deflection characteristics for uniformly applying and cushioning the restraining load of the belt on the person, wherein the energy dissipating means includes at least a pair of coned washer springs located in the slots between the load receiving surfaces to be deformed thereby as said surfaces move towards each other due to impact.

7. The invention as in claim 6 wherein a protrusion extends from each load receiving surface towards the other load receiving surface and wherein each coned washer spring has a central opening therein, said protrusions being aligned when the slots are aligned to slidably receive thereon the washer springs to keep the washer springs between the load receiving surfaces.

8. The invention as in claim 7 wherein the protrusions terminate at least a washer spring thickness from the end of the slot to permit insertion of the washer springs into the slots for assembly onto the protrusions.

9. The invention as in claim 6 wherein the anchor member includes an upper and a lower portion, said tongue on the retractor being sandwiched therebetween.

10. The invention as in claim 6 wherein the coned washer springs each have a large end, a small end and a body therebetween, at least one pair of the coned washer springs having like ends engaging, with the other like ends facing the load receiving surfaces.

11. The invention as in claim 10 wherein a plurality of coned washer springs are provided, at least some of the washer springs, other than the initial pair, having opposite ends adjacent each other.

* * * * *